W. WELLS.
Vapor Generators.

No. 139,445. Patented May 27, 1873.

WITNESSES.
Robert Morris Jr.
John P. McElroy.

INVENTOR.
William Wells
per
Brown Brothers
Attorneys.

UNITED STATES PATENT OFFICE.

WILLIAM WELLS, OF SALEM, MASSACHUSETTS.

IMPROVEMENT IN VAPOR-GENERATORS.

Specification forming part of Letters Patent No. 139,445, dated May 27, 1873; application filed March 26, 1873.

*To all whom it may concern:*

Be it known that I, WILLIAM WELLS, of Salem, in the county of Essex and State of Massachusetts, have invented a certain new and useful Improvement in Vapor-Generators; and that the following is a full, clear, and exact description of the same, reference being had to the accompanying drawings.

The present invention relates to an apparatus for the generation of vapor from the bisulphide of carbon, said vapor to be used for the purpose of a power to drive machinery, &c.; and the apparatus embraced herein is constructed of two vertically-arranged closed chambers or vessels, one within another, with a space or chamber of the outer vessel wholly surrounding the inner vessel. Each of these chambers or vessels is provided with a series of vertical pipes or tubes, those of the inner vessel, at both upper and lower ends, opening to the space or chamber of the outer vessel, and those of the outer vessel, at both upper and lower ends, opening to the outside of the outer vessel. The inner chamber is for the reception of the bisulphide of carbon, and the outer chamber is for the reception of water, and for each chamber there is provided a suitable feed-pipe to feed the same with their proper material, and the inner with a suitable pipe for the discharge of the vapor generated from the bisulphide of carbon therein, and both otherwise provided with any of the ordinary attachments, such as safety-valves for preventing accidents and indicating the pressure within the two vessels, &c., as in ordinary steam or other vapor-generating apparatus.

In addition to the above, the apparatus embraced herein is constructed as and for a purpose to be hereinafter particularly referred to.

Having thus in general terms referred to and described the main features in the construction of the apparatus or boiler embraced by this invention, I shall now proceed to describe the same, and also its mode of operation in detail, referring to the accompanying plate of drawings, in which—

Figure 1:
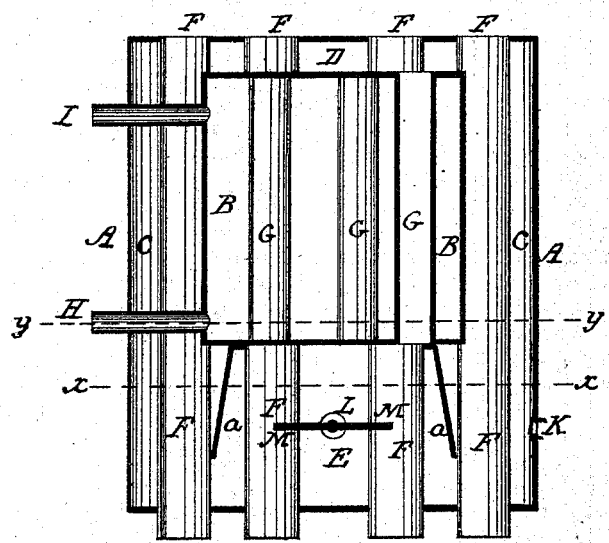
Figure 2:
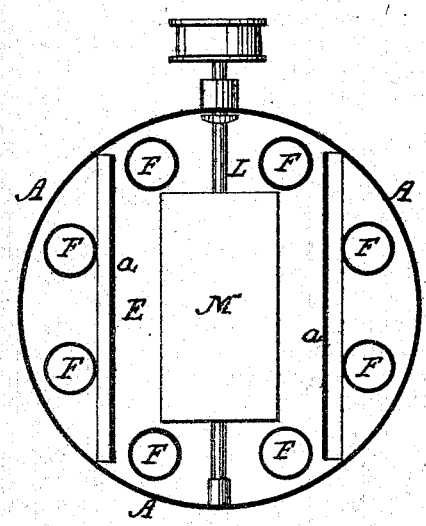
Figure 3:
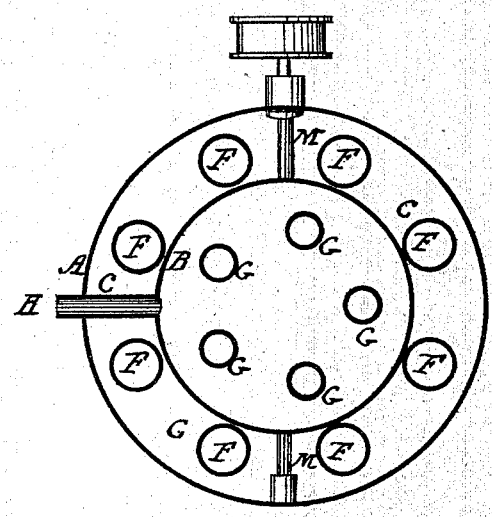

Figure 1 is a central vertical section; Fig. 2, a horizontal section in plane of line $xx$, Fig. 1; Fig. 3, a horizontal section in plane of line $yy$, Fig. 1.

A and B in the drawings represent, respectively, two closed vessels or chambers, both of which, in the present instance, are made of a cylindrical shape, but they may be made of other forms. The vessel B is within the vessel A, and concentric thereto, leaving an annular space, C, in vessel A about vessel B, and a space, D, at top and space E at bottom of vessel A, as shown. The vessels A and B, when located, are to be vertical. F, vertical tubes, arranged in a concentric circle within outer vessel A. These tubes are within the annular space C of vessel A, and at both their upper and lower ends open to the outside of the vessel A. G, vertical tubes, arranged within inner vessel B. These tubes occupy to a considerable extent the space or chamber of the vessel B, and at each end—that is, upper and lower—they open to the chamber of the outer vessel A. H, a feed-pipe to inner vessel B, communicating with it at its lower end, and I, a discharge or outlet-pipe of vessel B, this pipe entering the vessel B at its upper portion. The outer vessel A is also to have a feed-pipe, and this pipe is to open to it, as shown at K; and otherwise this vessel A, as well as vessel B, is to be provided with such of the well-known and common devices—as, for instance, safety-valves, test-cocks, &c.—as are usually employed upon apparatuses for the generation of steam or other vapors. The outer vessel A is for the reception of water, and the inner vessel B for the reception of the bisulphide of carbon, and to the outer the heat is applied as in ordinary steam boilers, the heat, products of combustion, &c., passing up through vertical tubes F, and thence to the chimney or escape-flue, the vessel A being incased or located by masonry or otherwise, as with all steam boilers of the upright and tubular kind. Heat thus passing through the tubes F of outer vessel A and otherwise acting upon the vessel A, obviously the water therein becomes heated, and, imparting its heat to the inner vessel B, secures or produces the heating of the bisulphide of carbon contained therein and the generation of vapor therefrom, which, passing out at the discharge-pipe I, can be used for the purposes of a power the same as steam is used. With the water at 212° Fahrenheit, the vapor generated from the bisulphide of carbon will have a pressure of sixty-five pounds to the square inch, and as the heat of the water increases, the pressure of vapor from bisulphide of carbon will proportionately increase, as is obvious. The presence of water or its equivalent as a medium of communication of heat to the bisulphide of carbon is, as is obvious, essential and necessary, and, under the arrangement above described, can be practically maintained; but, to insure and to render the same absolutely certain, a construction and arrangement of parts is provided as follows: L, a shaft arranged horizontally within space E at lower portion of chamber A. This shaft is adapted to turn in suitable bearings, and from one side of the chamber A it projects, being suitably packed where it passes through side of vessel A to prevent escape of water, and outside of the vessel it is adapted to be driven and revolved. This shaft L, within the chamber E of vessel A, is provided with vanes or wings M, arranged radially thereon, these vanes, as the shaft is revolved, forcing the water up through the tubes of the inner vessel B, and thus increasing the circulation of water through them. $a\ a$, walls arranged within chamber E of vessel A, as shown. These walls serve to confine the water of the vessel A more closely to the action of the forcing vanes or wings to the shaft L.

Heated air may be passed through the water of vessel A to heat the same, and the vapors from the bisulphide of carbon may, after use, be condensed, and after condensation fed into the bisulphide of carbon vessel B, to be again generated into vapor, &c., and so on. For forcing the bisulphide of carbon into vessel B, a forcing-pump is to be used, and this pump may be of any of the ordinary kinds, which are suitable.

Having thus described my invention, I shall state my claim as follows:

The vessels A B, arranged one within the other, in combination with the revolving-shaft L and partitions $a$, with or without the pipes F and G, substantially as described, for the purpose specified.

WILLIAM WELLS.

Witnesses:
ALBERT W. BROWN,
JOHN P. McELROY.